United States Patent
Hayles, Jr. et al.

(10) Patent No.: US 7,573,369 B2
(45) Date of Patent: Aug. 11, 2009

(54) SYSTEM AND METHOD FOR INTERROGATING AND LOCATING A TRANSPONDER RELATIVE TO A ZONE-OF-INTEREST

(75) Inventors: Ralph E. Hayles, Jr., San Antonio, TX (US); James A. Moryl, San Antonio, TX (US)

(73) Assignees: ATR Electronics, Inc., New Vernon, NJ (US); Southwest Research Institute, San Antonio, TX (US)

( * ) Notice: Subject to any disclaimer, the term of this patent is extended or adjusted under 35 U.S.C. 154(b) by 517 days.

(21) Appl. No.: 11/470,840

(22) Filed: Sep. 7, 2006

(65) Prior Publication Data

US 2007/0069886 A1    Mar. 29, 2007

Related U.S. Application Data

(60) Provisional application No. 60/714,930, filed on Sep. 7, 2005.

(51) Int. Cl.
   *H04Q 5/22* (2006.01)
(52) U.S. Cl. ............... 340/10.32; 340/10.1; 340/539.1; 340/539.15; 340/539.32; 340/572.9; 342/165; 342/11; 342/13; 342/42; 342/45; 343/786; 343/841; 343/907; 343/910; 343/911
(58) Field of Classification Search ............... 340/10.1, 340/10.32, 572.9, 539.1, 539.15, 539.32; 342/165–174, 11–13, 42, 45, 373, 375; 343/786, 343/907–910, 841, 911
See application file for complete search history.

(56) References Cited

U.S. PATENT DOCUMENTS

| | | | | | |
|---|---|---|---|---|---|
| 4,114,163 | A | * | 9/1978 | Borowick | 343/815 |
| 4,581,769 | A | * | 4/1986 | Grimsley et al. | 455/226.1 |
| 4,918,458 | A | * | 4/1990 | Brunner et al. | 343/795 |
| 5,274,397 | A | * | 12/1993 | Grover | 347/139 |
| 5,307,053 | A | * | 4/1994 | Wills et al. | 340/573.1 |
| 5,325,105 | A | * | 6/1994 | Cermignani et al. | 343/786 |
| 5,796,362 | A | * | 8/1998 | Ayasli et al. | 342/6 |
| 5,819,164 | A | * | 10/1998 | Sun et al. | 455/106 |
| 6,424,319 | B2 | * | 7/2002 | Ebling et al. | 343/911 L |
| 6,545,632 | B1 | * | 4/2003 | Lyons et al. | 342/45 |
| 6,664,915 | B1 | * | 12/2003 | Britton | 342/45 |
| 7,046,186 | B2 | * | 5/2006 | Rosenberg et al. | 342/45 |
| 2005/0212676 | A1 | * | 9/2005 | Steinberg | 340/572.8 |

OTHER PUBLICATIONS

Hayles, et al., "System and Method for Highly Directional Electronic Identification and Communication and Combat Identification System Employing the Same" U.S. Appl. No. 10/972,958, filed Oct. 25, 2004.

* cited by examiner

*Primary Examiner*—Daniel Wu
*Assistant Examiner*—Son M Tang

(57) ABSTRACT

A directional warning system and a method of warning of friendly forces. In one embodiment, the system includes: (1) a conductive shield having an opening at an end thereof and a radio frequency absorptive material located on an inner surface thereof, (2) a Luneberg lens located within the conductive shield and (3) a plurality of feed horns located proximate a portion of the Luneberg lens that is distal from the opening and arranged relative thereto based on a zone-of-interest with which the directional warning system may be associated.

8 Claims, 4 Drawing Sheets

SYSTEM AND METHOD FOR INTERROGATING AND LOCATING A TRANSPONDER RELATIVE TO A ZONE-OF-INTEREST

CROSS-REFERENCE TO RELATED APPLICATION

The present application is related to and claims priority based on U.S. Provisional Application Ser. No. 60/714,930, filed by Hayles, et al., on Sep. 7, 2005, entitled "A Compact Portable Interrogation and Response System," commonly assigned with the invention and incorporated herein by reference. The present application is also related to U.S. patent application Ser. No. 10/972,958, filed by Hayles, et al., on Oct. 25, 2004, entitled "System and Method for Highly Directional Electronic Identification and Communication and Combat Identification System Employing the Same," incorporated herein by reference.

TECHNICAL FIELD OF THE INVENTION

The invention is directed, in general, to wireless identification and communication systems and, more particularly, to a system and method for interrogating and locating a transponder relative to a zone-of-interest which, in the context of a weapon, is called a "kill zone."

BACKGROUND OF THE INVENTION

Wireless identification and communication systems are a vital technology in today's world. Most such systems are omnidirectional; their antennas broadcast signals fairly uniformly in all directions. Omnidirectional communication systems are desirable in many applications, because their antennas need not be steered to maintain communication. They can serve broader territories, too.

However, some applications benefit from directional communication systems. Compared to omnidirectional communication systems, directional communication systems use antennas that transmit signals predominantly to, or receive signals predominantly from, a relatively narrow span of directions. Directional communication systems have some distinct advantages. First, since they focus the power they transmit onto a relatively narrow span of directions, they require less power than omnidirectional systems or alternatively are able to transmit farther than omnidirectional systems using the same power. Second, signal interception by an unauthorized third party is less likely, since the third party must be aligned with the transmitting antenna in order to receive the signal.

Secure and reliable wireless communication is particularly important in the context of combat. Often, such communication merely involves identification. Split-second weapon firing decisions are based on target identification. Identifying the target of a weapon that is about to be fired is important to ensure that enemy forces suffer a loss, and not one's own, "friendly" forces. In addition to identifying the target, it should also be determined whether any friendly forces are within a "zone-of-interest" about the target. In the context of weaponry, this "zone-of-interest" is called a "kill zone." The "kill zone" of a weapon is the space surrounding the target within which the weapon may cause a substantial effect. In the case of lethal weapons, the kill zone is the space within which substantial physical harm, probably death, is likely to occur to a person. Obviously, the size of kill zones varies widely, depending upon the type, configuration and mode of operation of the weapon to which the kill zone corresponds.

Knowing that a potential target is not a friendly element, and knowing that no friendly elements are within the kill zone are critically important in order to avoid fratricide (so-called "friendly fire" incidents). Outside of the context of weaponry, a "zone-of-interest" is a space desired to be analyzed or within which warning or identification should take place.

Full communication between elements of a force is also important. However, conventional battlefield communication systems are bulky and thus difficult to transport. Mobility is a key attribute of a modern fighting force. Therefore, a more transportable communication system would be highly advantageous.

Accordingly, what is needed in the art is a system capable of carrying out highly directional electronic identification or warning. More specifically, what is needed in the art is a way to determine whether friendly forces are approaching or within the kill zone of a weapon. Alternatively, what is more specifically needed in the art is a way to warn friendly forces that they are approaching or within the kill zone of a weapon. What is still further needed in the art is a compact, lightweight, energy-efficient system capable of being independent of any host weapon system but compatible with a variety of weapons, including light arms, field artillery, armored vehicles, attack aircraft, bombers, helicopters and combatant ships and non-weapon mobile and stationary platforms, such as tripods.

SUMMARY OF THE INVENTION

To address the above-discussed deficiencies of the prior art, the invention provides, in one aspect, a directional warning system. In one embodiment, the system includes: (1) a conductive shield having an opening at an end thereof and a radio frequency absorptive material located on an inner surface thereof, (2) a Luneberg lens located within the conductive shield and (3) a plurality of feed horns located proximate a portion of the Luneberg lens that is distal from the opening and arranged relative thereto based on a kill zone (which may be one of a range of kill zones) of a weapon (which may be part of a group of weapons) with which the directional warning system may be associated.

In another aspect, the invention provides a method of warning of friendly forces. In one embodiment, the method includes: (1) projecting a plurality of beams from a directional warning system including: (1a) a conductive shield having an opening at an end thereof and a radio frequency absorptive material located on an inner surface thereof, (1b) a Luneberg lens located within the conductive shield and (1c) a plurality of feed horns located proximate a portion of the Luneberg lens that is distal from the opening and arranged relative thereto based on a kill zone of a weapon with which the directional warning system may be associated and (2) generating a warning based on a number of the beams received.

The foregoing has outlined preferred and alternative features of the invention so that those skilled in the pertinent art may better understand the detailed description of the invention that follows. Additional features of the invention will be described hereinafter that form the subject of the claims of the invention. Those skilled in the pertinent art should appreciate that they can readily use the disclosed conception and specific embodiment as a basis for designing or modifying other structures for carrying out the same purposes of the invention. Those skilled in the pertinent art should also realize that such equivalent constructions do not depart from the spirit and scope of the invention.

BRIEF DESCRIPTION OF THE DRAWINGS

For a more complete understanding of the invention, reference is now made to the following descriptions taken in conjunction with the accompanying drawing, in which.

DETAILED DESCRIPTION

Figure 1:
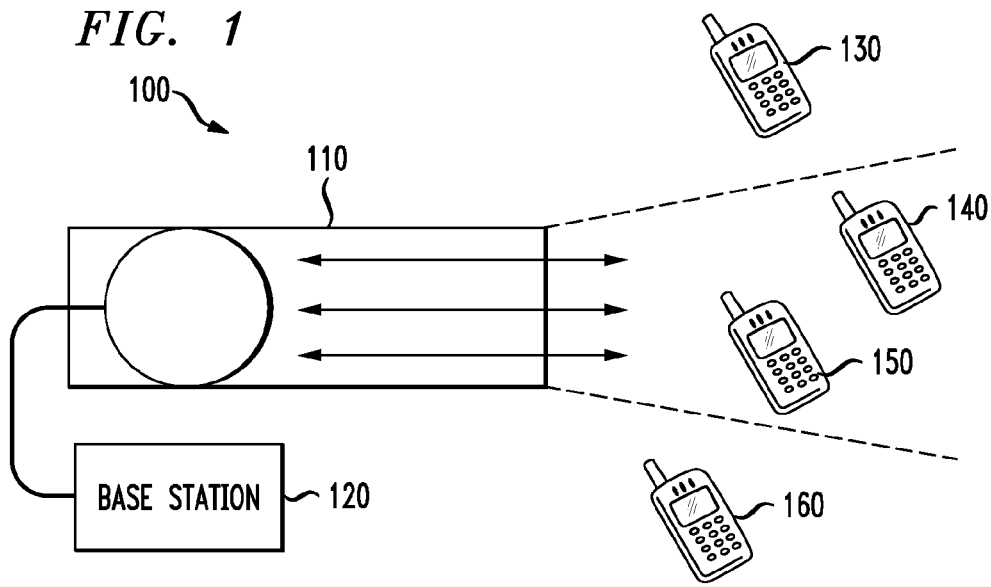
FIG. 1 illustrates a schematic view of one embodiment of a directional communication system constructed according to the principles of the invention and configured to operate as a directional warning system.

Referring initially to FIG. 1, illustrated is a schematic view of one embodiment of a directional communication system constructed according to the principles of the invention and configured to operate as a directional warning system. The directional communication system, generally designated 100, includes a directional antenna 110 and a base station 120. The directional antenna 110 is a directional antenna that transmits signals that travel out as a beam within a defined cone. The directional antenna 110 also receives signals that originate within the defined cone. The structure and function of the directional antenna 110 will be set forth in substantially greater detail in conjunction with FIG. 2.

The base station 120 may be analog or digital, capable of transmitting or receiving on any operating frequency or band of frequencies suitable to a Luneberg lens and capable of transmitting at any suitable power level. Those skilled in the pertinent art will understand that a wide array of base station topologies is within the broad scope of the invention. The base station 120 may be housed within the directional antenna 110.

A plurality of transceivers 130, 140, 150, 160 (which, in the illustrated embodiment, are omnidirectional) are configured to receive signals from the antenna based on a direction relative thereto. In the illustrated embodiment, the plurality of transceivers 130, 140, 150, 160 assume the general shape, size and weight of a common cellphone, although this certainly need not be the case. In other embodiments, the plurality of transceivers 130, 140, 150, 160 are transponders or simply receivers.

In the specific example illustrated in FIG. 1, the transceivers 140, 150 are within the defined cone within which the directional antenna 110 projects its beam and within which the directional antenna 110 is capable of receiving signals. Thus, the transceivers 140, 150 are capable of communicating with the base station 120 via the directional antenna 110. In contrast, the transceivers 130, 160 are outside of the defined cone and therefore not in direction to communicate with the base station 120. The ability of the directional communication system 100 to communicate selectively with the plurality of transceivers 120, 130, 140, 150 is valuable in certain applications, which will be highlighted in the discussion that follows. In some embodiments, such communication involves both transmission and reception; in other embodiment, such communication involves only transmission.

Figure 2:
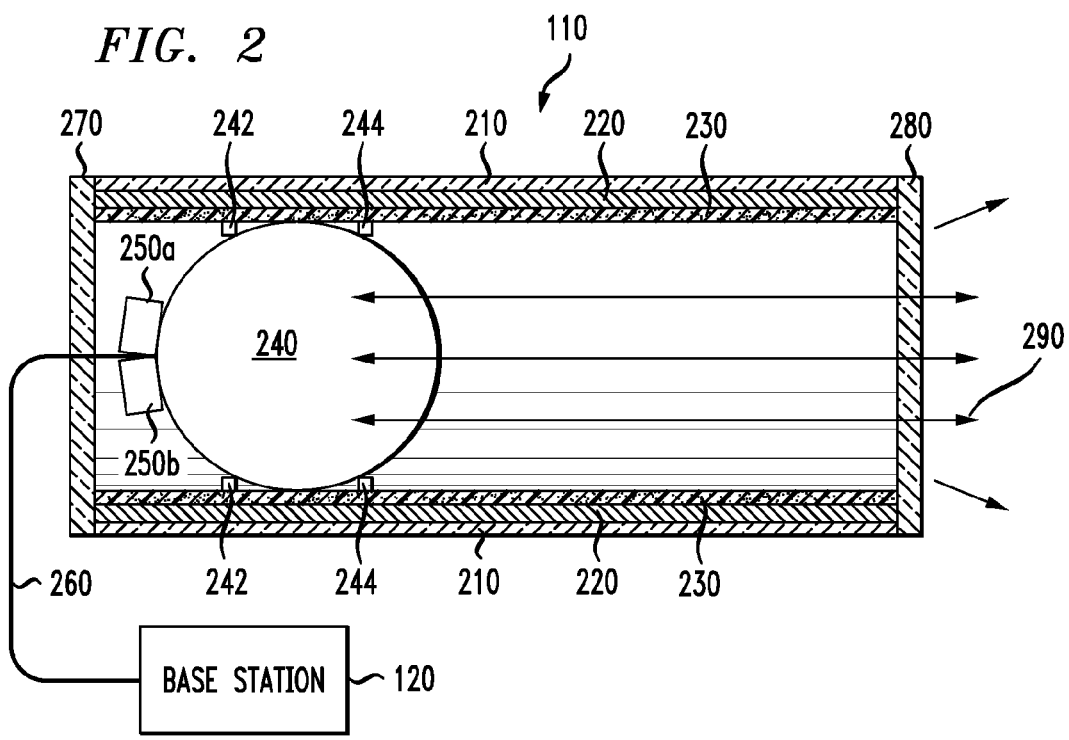
FIG. 2 illustrates a schematic sectional view of one embodiment of a directional antenna constructed according to the principles of the invention and that can be employed in the directional communication system of FIG. 1.

Turning now to FIG. 2, illustrated is a schematic sectional view of one embodiment of a directional antenna 110 constructed according to the principles of the invention and that can be employed in the directional communication system 100 of FIG. 1. The directional antenna 110, which is able in various embodiments to transmit and receive low power, communications signals with substantial gain, can be used to restrict communications to devices physically located within the narrow sector at which the antenna is aimed. The beamwidth of the transmitted signal can be established to specific dimensions according to the application of the system in which it is employed. It should be noted that the beamwidth is a function of the physical size and configuration of the directional antenna 110, and therefore may be established to suit a given application.

As will be seen, the directional antenna 110 can be used as an interrogation component of a combat identification system in which friendly forces are equipped with omnidirectional transponder or transceiver units designed to function at or near the frequency employed by the interrogation unit. The directional antenna 110 may be aligned with the sight of a direct fire weapons system (one type of weapon) and transmit therefrom an interrogation signal at a potential target. The transponders of any friendly forces receiving the interrogation signal would respond with a signal identifying themselves as friendly forces and perhaps disable the weapon system from firing, perhaps subject to manual override. Alternatively, signals emanating from the directional antenna 110 may constitute a warning signal to the various transponders that they are within a kill zone of the weapon with which the directional antenna is associated.

The directional antenna 110 can alternatively be used as a component of a highly focused radar system capable of directing a radar pulse at a specific object. The directional antenna 110 can further alternatively be used as part of a secure point-to-point communications system in which the transmissions will only be detectable by receivers, transceivers or sensors in the direction at which the antenna is aimed.

The directional antenna 110 includes a protective shell 210, which may advantageously be substantially dielectric. Located radially inward of the protective shell 210 is a conductive shield 220, which may be made of copper. In the illustrated embodiment, the protective shell 210 substantially supports the conductive shield 220, although the conductive shield 220 may be sufficiently thick to be self-supporting. Located radially inward of the conductive shield 220 is a layer of radio frequency absorptive material 230. In the illustrated embodiment, the radio frequency absorptive material 230 is a conductive foam (typically a carbon-impregnated foam)/ which is commercially available from, for example, R&F Products of San Marcos, Calif. In the embodiment illustrated in FIG. 2, the protective shell 210, the conductive shield 220 and the radio frequency absorptive material 230 take the form of open-ended concentric cylinders.

In the illustrated embodiment, the radio frequency absorptive material 230 and the conductive shield 220 are longitudinally coextensive, meaning that the radio frequency absorptive material 230 fully covers the inner surface of the conductive shield 220, but does not extend beyond it. Of course, this need not be the case.

A Luneberg lens 240 is located radially inward of the radio frequency absorptive material 230. Those skilled in the pertinent art understand that a Luneberg lens is a generally spherical structure composed of layers of materials having different dielectric constants. A Luneberg lens functions to cause diverging radio frequency signals to collimate or to cause collimated radio frequency signals to converge. For a general discussion of Luneberg lenses, see, e.g., http://stewks.ece.stevens-tech.edu/luneberg.dir/Report2.apr99/luneberg apr99.pdf.

One or more feed horns (actually two feed horns 250a, 250b in the embodiment of FIG. 2) are located proximate the Luneberg lens 240. (Feed horns may also be called "feed strips;" the two terms should be regarded as interchangeable for the purposes of the present discussion.) In the context of FIG. 2, the Luneberg lens 240 functions substantially to collimate diverging radio frequency signals transmitted from the feed horns 250a, 250b and further to cause substantially collimated radio frequency signals received into the directional antenna 110 to converge on the feed horns 250a, 250b.

A transmission line 260 couples the feed horns 250a, 250b to the base station 120. A pair of retainer rings 242, 244 cooperate to retain the Luneberg lens 240 within the directional antenna 110.

A rear end cap 270 and a dielectric front end cap 280 advantageously seal the interior of the directional antenna 110 as against environmental elements. The front end cap 280 covers a radiating opening of the directional antenna 110. Accordingly, FIG. 2 shows a plurality of collimated double-ended arrow lines extending from the Luneberg lens 240 and through the radiating opening of the directional antenna 110. The double-ended arrow lines represent radio frequency signals transmitted from or received into the directional antenna 110. The feed horns 250a, 250b are located proximate the portion of the Luneberg lens 240 that is distal from the radiating opening of the directional antenna 110.

In the illustrated embodiment of the directional antenna 110, an outer diameter of the protective shell 210 is at least five inches. In one specific embodiment, the outer diameter of the protective shell 210 is 6.650 inches and about 15 inches long. In another specific embodiment, the outer diameter of the protective shell 210 is less than 2 inches and proportionately long. Those skilled in the art will understand, however, that the broad scope of the invention is not limited to particular dimensions of outer diameter or length.

In the illustrated embodiment of the directional antenna 110, the radio frequency absorptive material 230 has a thickness between about 0.1 inch and about one inch. More specifically, the radio frequency absorptive material 230 has a thickness of about 0.375 inch. Those skilled in the art will understand, however, that the broad scope of the invention is not limited to particular thicknesses.

In the illustrated embodiment of the directional antenna 110, the antenna produces radio frequency signals having a carrier frequency of between about 4 GHz and about 40 GHz. Those skilled in the art will understand, however, that the broad scope of the invention is not limited to particular carrier frequencies.

In the illustrated embodiment, the radio frequency signals bear digital data when used for communication. Those skilled in the pertinent art understand that digital communication has some substantial advantages over analog communication, particularly when secure communication (often by means of encryption) is desired. The invention is not, however, limited to communication of digital data.

In the illustrated embodiment, the conductive shield 220 (which, again, may be copper) has a thickness less than about 0.1 inch. Those skilled in the art will understand, however, that the conductive shield may be thicker or thinner as a particular application may find advantageous.

In the illustrated embodiment, the Luneberg lens 240 has a diameter between about two inches and about eight inches. Those skilled in the art will understand, however, that the broad scope of the invention is not limited to particular diameters.

Each of the beams of the antenna may have a 3 decibel (dB) width of about 7° and a null-to-null width of about 14°. The diameter of the Luneberg lens 240 and the distance of the Luneberg lens 240 from the radiating opening of the directional antenna 110 may be adjusted to provide different beamwidths. Those skilled in the art will understand that the broad scope of the invention is not limited to particular beamwidths.

Figure 3A:
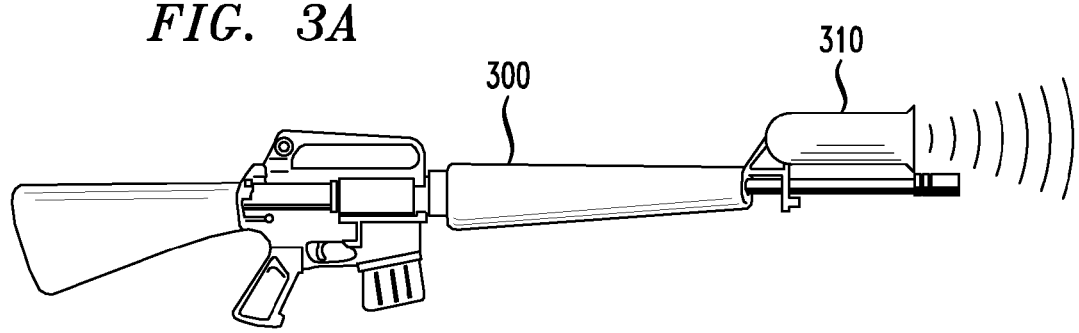
FIG. 3A illustrates a schematic view of a rifle having a directional warning system associated therewith.

Turning now to FIG. 3A, illustrated is a schematic view of a rifle 300 having a directional warning system 310 associated therewith. It should be noted that while FIG. 3A shows a rifle 300, which is a handheld weapon, the directional warning system 310 may be associated with any weapon that may be aimed to establish a kill zone. It should also be noted that the directional warning system 310 may alternatively be associated with a non-lethal weapon, such as an acoustic, microwave, water-cannon or laser-based blinding weapon. Such weapons are often used for crowd control. It should also be noted that the directional warning system 310 may alternatively be associated with a non-weapon warning or identification system, which may take the form of a mobile and stationary platform, such as a tripods. Irrespective of the type of weapon (or non-weapon) with which the directional warning system 310 is associated, it is oriented such that a plurality of beams are projected from the directional warning system 310 toward the kill zone of the weapon. The plurality of beams, and their relative position and orientation to produce a pattern based on kill zone will be illustrated in more detail in FIG. 3B.

Figure 3B:
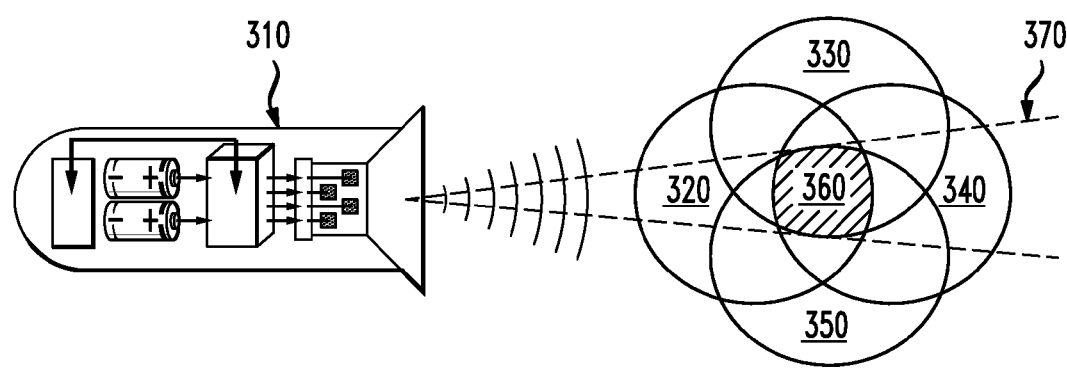
FIG. 3B illustrates a schematic sectional view of the directional warning system of FIG. 3A along with beams emanating therefrom and forming a pattern relative to a kill zone of the rifle.

Turning now to FIG. 3B, illustrated is a schematic sectional view of the directional warning system 310 of FIG. 3A along with beams emanating therefrom and forming a pattern relative to a kill zone of the rifle. In the embodiment of FIG. 3B, four feed horns (shown but not referenced) produce four corresponding beams 320, 330, 340, 350. Those skilled in the pertinent art should understand that the four corresponding beams 320, 330, 340, 350 may differ from one another in terms of carrier frequency, or the type or frequency of modulation applied to the carrier frequency such that the beams may be discriminated from one another.

A central region 360 is defined by the intersection of the four beams 320, 330, 340, 350. The orientation of the beams 320, 330, 340, 350 and, optionally, associated modulation is chosen such that the central region 360 corresponds to a kill zone of a given weapon, in this case the rifle 300 of FIG. 3A. As can be seen in FIG. 3B, the central region 360 projects out in a cone 370 from the directional warning system 310. Those skilled in the art will understand that, while each of the beams has a width that is determined by certain of the components in the directional warning system 310, the size of the central region 360 is instead determined by the placement of the feed horns on the Luneberg lens (see FIG. 2) and the associated modulation. Thus, a given design of a directional warning system 310 can be adapted to the differing kill zones of different weapons merely by moving the feed horns relative to the Luneberg lens and changing the threshold criterion for reception of the plurality of modulated beams at the transceiver (see FIG. 1). Some alternative embodiments for operating the directional warning system 310 will now be described.

Figure 4:
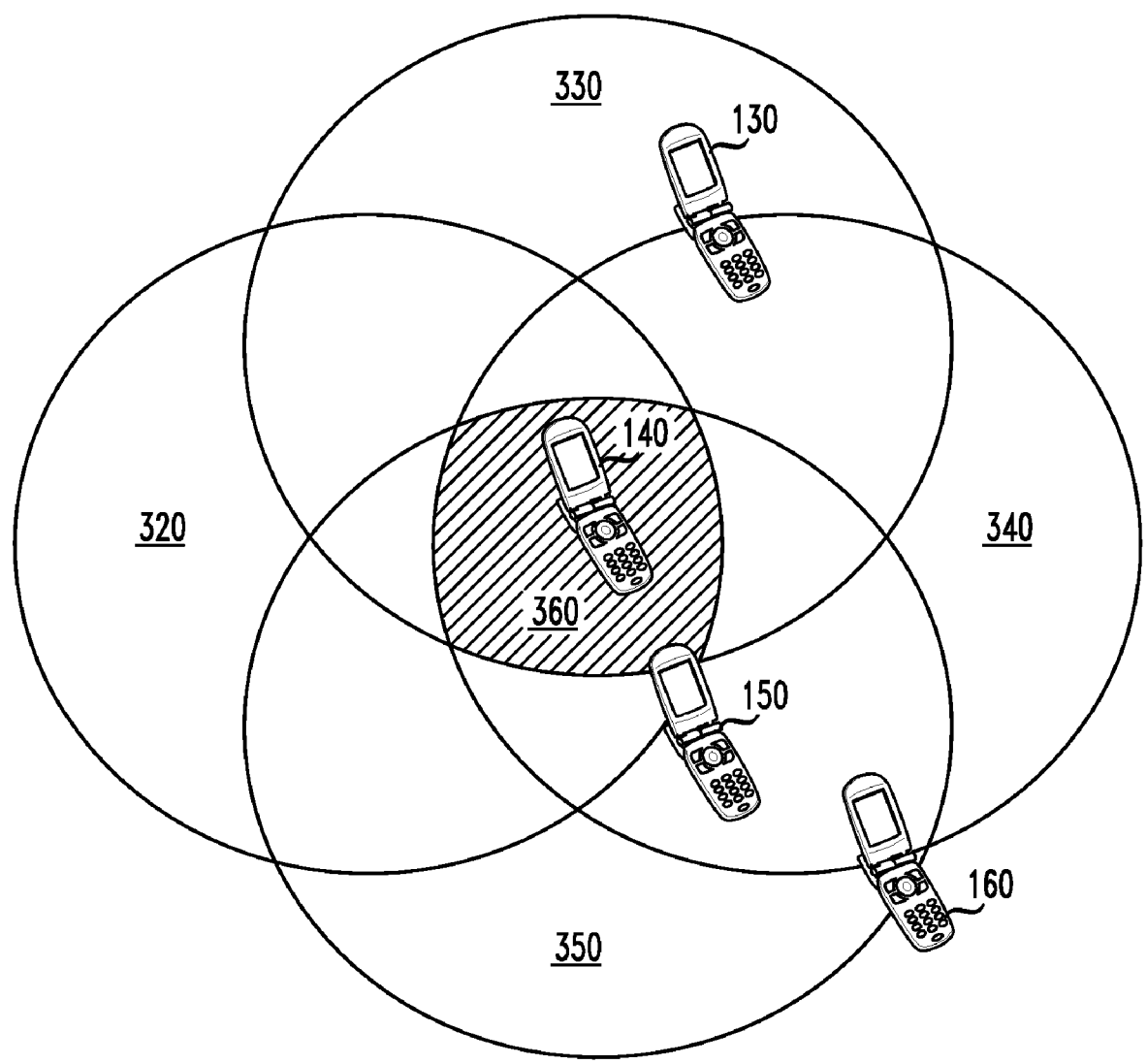
FIG. 4 illustrates a more detailed schematic view of the pattern of FIG. 3B.

Turning now to FIG. 4, illustrated is a more detailed schematic view of the pattern of FIG. 3B. FIG. 4 shows the four beams 320, 330, 340, 350 and the central region 360 that constitutes the intersection of the four beams 320, 330, 340, 350 and corresponds to the kill zone of a weapon. Four receivers, transponders or transceivers (generically "units") 130, 140, 150, 160 are shown. For purposes of this discussion, a receiver is capable of wirelessly reception but not wireless transmission, a transponder automatically generates a coded response to an interrogating signal, and a transceiver is capable of wireless reception and wireless transmission and can support full wireless communications between elements of a force. A receiver, transponder and transceiver may include such data input, processing, storage and output circuitry as appropriate to a given application. The units 130, 140, 150, 160 may interact with the directional warning system 310 of FIG. 3A in several different ways.

First, if the units 130, 140, 150, 160 are merely receivers, they may simply be equipped to receive one or more of the beams 320, 330, 340, 350 and determine their proximity to the kill zone based on the relative signal quality of the number of beams received. For example, the unit 130 strongly receives the beam 330 and therefore ostensibly determines that it is outside of the kill zone. Likewise, the unit 160 strongly receives the beams 340, 350 and therefore ostensibly determines that it is outside of the kill zone. On the other hand, the units 140, 150 equally receive within a programmable criterion all four of the beams 320, 330, 340, 350 and therefore determine that they are within the kill zone. As a result, the units 140, 150 advantageously warn the friendly forces with which they are associated that they are within a kill zone, prompting them to leave. The units 130, 160 may also warn their associated friendly forces that they are near a kill zone, perhaps prompting them to change their pattern of movement to avoid the kill zone.

If the units 130, 140, 150, 160 are transponders, they are equipped to respond with a code when interrogated by the directional warning system 310. It will therefore be assumed for purposes of this example that the directional warning system 310 interrogates with a unique modulation on each of the multiple beams 320, 330, 340 and 350. Those skilled in the pertinent art will understand, however, that other configurations of multiple beams and unique modulations may be employed. Continuing with the example, the unit 130 strongly receives the beam 330 and therefore does not respond to the interrogation. Likewise, the unit 160 strongly receives the beams 340, 350 and therefore does not respond to the interrogation. On the other hand, the units 140, 150 equally receive all four of the beams 320, 330, 340, 350 within the programmable criterion and therefore respond to the interrogation with notification that they are within the kill zone. The directional warning system 310 receives the notification that units 140 and 150 are within the kill zone. In response, the directional warning system 310 may warn the operator of the weapon, disable the weapon from firing, provide a warning back to the units 140, 150 (or even perhaps an alert to the units 130, 160) or any combination as desired in a particular application.

If the units 130, 140, 150, 160 are transceivers, subsequent communications may take place between the operator of the weapon and the friendly forces associated with one or more of the units 130, 140, 150, 160. These communications may assist the friendly forces in clearing the kill zone for subsequent successful weapon operation.

Figure 5:
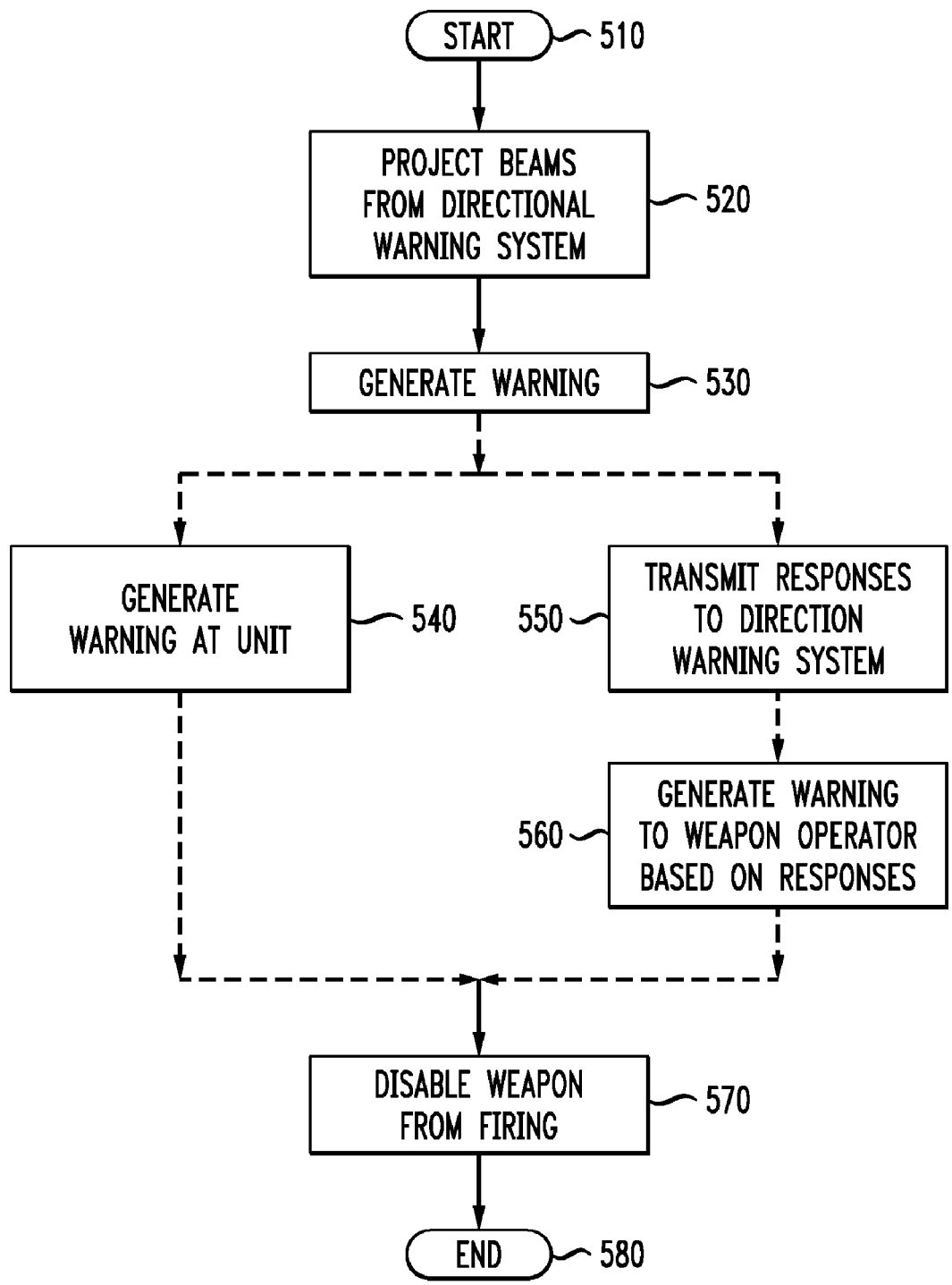
FIG. 5 illustrates a flow diagram of one embodiment of a method of identifying or warning of friendly forces approaching or within a kill zone of a weapon carried out according to the principles of the invention.

Turning now to FIG. 5, illustrated is a flow diagram of one embodiment of a method of identifying or warning of friendly forces approaching or within a kill zone of a weapon carried out according to the principles of the invention.

The method begins in a start step 510. In a step 520, a plurality of beams are projected from a directional warning system. The system may be as described above. Next, a warning is generated based on a number and quality of the beams received. In a step 530, the generating may be carried out in a receiver located proximate a kill zone of a weapon. In alternative or additional steps 540, 550, the generating may be carried out by: transmitting responses to the beams with a transponder located proximate a kill zone of a weapon (the step 540) and generating the warning based on a number of the responses (the step 550). In a step 560, a weapon may be disabled based on the number. The method ends in and end step 570.

Although the invention has been described in detail, those skilled in the pertinent art should understand that they can make various changes, substitutions and alterations herein without departing from the spirit and scope of the invention in its broadest form.

What is claimed is:

1. A method of warning of friendly forces, comprising:
   projecting a plurality of beams from a directional warning system including:
   a conductive shield having an opening at an end thereof and a radio frequency absorptive material located on an inner surface thereof,
   a Luneberg lens located within said conductive shield, and
   a plurality of feed horns located proximate a portion of said Luneberg lens that is distal from said opening and arranged relative thereto based on a zone-of-interest with which said directional warning system may be associated; and
   generating a warning based on a number of said beams received.

2. The method as recited in claim 1 wherein said plurality of beams differ from one another to allow said plurality of beams to be discriminated.

3. The method as recited in claim 1 wherein said generating is carried out in a receiver located proximate a zone-of-interest.

4. The method as recited in claim 1 wherein said generating comprises:
   transmitting responses to said beams with a transponder located proximate a zone-of-interest; and
   generating said warning based on a number of said responses.

5. The method as recited in claim 1 wherein said plurality of beams intersect based on a zone-of-interest.

6. The method as recited in claim 1 further comprising disabling a weapon based on said number.

7. The method as recited in claim 1 wherein each of said plurality of beams has a 3 decibel width of about 7°.

8. The method as recited in claim 1 wherein each of said plurality of beams has a null-to-null width of about 14°.

* * * * *